United States Patent
Inaoka et al.

(10) Patent No.: US 9,856,692 B2
(45) Date of Patent: Jan. 2, 2018

(54) REDUCED PRESSURE DOUBLE GLAZED GLASS PANEL

(71) Applicant: Nippon Sheet Glass Company, Limited, Tokyo (JP)

(72) Inventors: Daisuke Inaoka, Tokyo (JP); Yoshifumi Kijima, Tokyo (JP); Tetsuo Minaai, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 267 days.

(21) Appl. No.: 14/655,236

(22) PCT Filed: Dec. 25, 2013

(86) PCT No.: PCT/JP2013/007584
§ 371 (c)(1),
(2) Date: Jun. 24, 2015

(87) PCT Pub. No.: WO2014/103301
PCT Pub. Date: Jul. 3, 2014

(65) Prior Publication Data
US 2015/0354264 A1 Dec. 10, 2015

(30) Foreign Application Priority Data
Dec. 28, 2012 (JP) .................................. 2012-287386

(51) Int. Cl.
*E06B 3/66* (2006.01)
*E06B 3/67* (2006.01)

(52) U.S. Cl.
CPC .............. *E06B 3/6722* (2013.01); *E06B 3/66* (2013.01); *E06B 3/6612* (2013.01); *E06B 3/6715* (2013.01); *Y02B 80/24* (2013.01)

(58) Field of Classification Search
CPC ...... E06B 3/6612; E06B 3/6715; Y02B 80/24
See application file for complete search history.

(56) References Cited

U.S. PATENT DOCUMENTS

| 5,362,689 A | 11/1994 | Morimoto et al. |
| 6,790,494 B2 | 9/2004 | Asano et al. |

(Continued)

FOREIGN PATENT DOCUMENTS

| CN | 1476379 | 2/2004 | |
| EP | 1394130 A1 * | 3/2004 | ............. C03C 17/36 |

(Continued)

OTHER PUBLICATIONS

International Search Report issued in International Application No. PCT/JP2013/007584, dated Feb. 10, 2014, 4 pages.

*Primary Examiner* — Donald J Loney
(74) *Attorney, Agent, or Firm* — Hamre, Schumann, Mueller & Larson, P.C.

(57) ABSTRACT

The reduced pressure double glazed glass panel of the present invention includes an outside glass sheet, an inside glass sheet, and a gap portion that are joined together, with the gap portion being formed between the glass sheets and sealed under reduced pressure. Here, the outside glass sheet has a first glass surface disposed to face the outdoor space and a second glass surface disposed to face the gap portion. A Low-E film is formed on the second glass surface. The following relations hold: (Emissivity of Low-E film $\in$)$\leq$0.067; 31%$\leq$(Solar reflectance on First glass surface $R_{G(solar)}$)$\leq$40%; (48$-R_{G(solar)}$)%$\leq$(Solar absorptance on First glass surface $A_{G(solar)}$)$\leq$17%; $(A_{G(solar)})\leq\{18.3-(0.07\times R_{G(solar)})+(20\times\in)\}$%; (Solar heat gain coefficient SHGC) $\leq$0.50; and (Thermal transmittance U value)$\leq$1.2 W/m$^2$·K or less. According to the present invention, it is possible to provide a reduced pressure double glazed glass panel having sufficient heat insulating and heat shielding properties and being less susceptible to bending when exposed to solar radiation.

16 Claims, 4 Drawing Sheets

(56) References Cited

U.S. PATENT DOCUMENTS

| 6,955,026 B2 | 10/2005 | Misonou |
| 7,282,248 B2 | 10/2007 | Asano et al. |
| 2003/0186064 A1 | 10/2003 | Murata et al. |

FOREIGN PATENT DOCUMENTS

| JP | 6-102557 B2 | 7/1992 |
| JP | 6-094377 B2 | 8/1992 |
| JP | 10236848 | 9/1998 |
| JP | 2882728 B2 | 4/1999 |
| JP | 2002-012455 | 1/2002 |
| JP | 2003-104758 | 4/2003 |
| JP | 2003-321255 | 11/2003 |
| JP | 2004-352567 | 12/2004 |
| WO | 02/092529 | 11/2002 |

\* cited by examiner

REDUCED PRESSURE DOUBLE GLAZED GLASS PANEL

TECHNICAL FIELD

The present invention relates to a reduced pressure double glazed glass panel most suitable for use in windows of buildings and the like.

BACKGROUND ART

As a means for increasing the heat shielding effect of a window of a building, a heat-ray absorbing glass is used. For example, Patent Literature 1 and Patent Literature 2 each disclose a heat-ray absorbing glass containing a specific combination of metal oxides. There have recently been developed double glazed glass panels having not only heat shielding properties but also heat insulating properties. For example, Patent Literature 3 discloses a double glazed glass panel including a heat-ray absorbing colored glass sheet provided on the outdoor side, a clear glass sheet provided on the indoor side, and a low emissivity film formed on the indoor-side surface of the outdoor-side heat-ray absorbing colored glass sheet.

In a conventional double glazed glass panel, an air layer (or a gas layer such as an argon gas layer) between an outside glass sheet and an inside glass sheet need have a thickness of at least 6 mm to ensure the heat insulating properties, and thus the entire double glazed glass panel has a large thickness. For example, in the case where the outside glass sheet and the inside glass sheet each have a thickness of 3 mm and the air layer has a thickness of 6 mm, the entire double glazed glass panel has a large thickness of 12 mm and is not suitable for use in window frames of residential houses. Under these circumstances, there has been developed a reduced pressure double glazed glass panel including a very thin vacuum layer with a thickness of about 0.2 mm provided between outside and inside glass sheets, instead of an air layer between the glass sheets.

If a heat-ray absorbing colored glass sheet is provided on the outdoor side and a low emissivity film is formed on the indoor-side surface of this heat-ray absorbing colored glass sheet in such a reduced pressure double glazed glass panel, the glass panel can, in spite of its small thickness, reduce the intensity of solar radiation coming into a room during the summer daytime and block incoming heat from outside during the summer nighttime. This reduced pressure double glazed glass panel can not only increase the cooling efficiency in summer but also increase the heating efficiency in winter.

In a conventional, common double glazed glass panel, a soft material is used as a sealing material. In contrast, in the reduced pressure double glazed glass panel, a hard material such as a low melting glass or a metal solder is used as a sealing material. Therefore, when the reduced pressure double glazed glass panel is exposed to solar radiation and the temperature difference between the outside glass sheet and the inside glass sheet increases, the difference in thermal expansion between the glass sheets cannot be absorbed due to the deformation of the sealing material, which may cause bending of the glass sheets. In particular, when the rigidity of the window frame is not sufficient, the frame is also bent subsequent to the bending of the glass sheets. When the frame is bent, not only the operation of opening and closing the window cannot be performed smoothly, but also the frame and the panel may scrape against each other and be damaged. Patent Literature 4 discloses a reduced pressure double glazed glass panel which is less susceptible to bending when exposed to solar radiation.

CITATION LIST

Patent Literature

Patent Literature 1: JP 06(1994)-94377 B2
Patent Literature 2: JP 06(1994)-102557 B2
Patent Literature 3: JP 2882728 B2
Patent Literature 4: WO 2002/092529 A1

SUMMARY OF INVENTION

Technical Problem

However, the reduced pressure double glazed glass panel disclosed in Patent Literature 4 cannot sufficiently reduce the bending of the glass sheets and the subsequent bending of the window frame.

Under these circumstances, it is an object of the present invention to provide a reduced pressure double glazed glass panel having sufficient heat insulating and heat shielding properties and being less susceptible to bending when exposed to solar radiation.

Solution to Problem

The present invention provides a reduced pressure double glazed glass panel for separating an indoor space from an outdoor space, the reduced pressure double glazed glass panel including: a pair of glass sheets; and a gap portion formed between the pair of glass sheets and sealed under reduced pressure with a peripheral sealing portion provided between the pair of glass sheets along peripheries thereof. The pair of glass sheets includes an inside glass sheet provided to face the indoor space and an outside glass sheet provided to face the outdoor space. The outside glass sheet has a first glass surface disposed to face the outdoor space and a second glass surface disposed to face the gap portion. A Low-E film with an emissivity $\in$ of 0.067 or less is formed on the second glass surface. The outside glass sheet has a solar reflectance $R_{G(solar)}$ of 31% or more and 40% or less as measured on the first glass surface, and the outside glass sheet has a solar absorptance $A_{G(solar)}$ of $(48-R_{G(solar)})\%$ or more and 17% or less as measured on the first glass surface. The reduced pressure double glazed glass panel has a solar heat gain coefficient SHGC of 0.50 or less and a thermal transmittance U value of 1.2 W/m²·K or less.

Advantageous Effects of Invention

According to the present invention, the following relations hold:

$\in \leq 0.067$;

$31\% \leq R_{G(solar)} \leq 40\%$;

$(48-R_{G(solar)})\% \leq A_{G(solar)} \leq 17\%$;

$SHGC \leq 0.50$; and $U \text{ value} \leq 1.2 W/m^2 \cdot K$, where $\in$ is the emissivity of the Low-E film (low emissivity film), $R_{G(solar)}$ is the solar reflectance of the outside glass sheet as measured on the first glass surface, $A_{G(solar)}$ is the solar absorptance of the outside glass sheet as measured on the first glass surface, SHGC is the solar heat gain coefficient of the reduced pressure double glazed glass panel, and U value is the thermal transmittance of the reduced pressure double glazed glass panel. When the above relations hold, the temperature difference ΔT between the outside glass sheet and the inside glass sheet can be reduced. For example, when the measurement is performed under the summertime solar radiation conditions (solar radiation heat flux: 700 kcal/m²h (814 W/m²), outdoor temperature: 35° C., indoor temperature: 25° C.), the temperature difference ΔT can be reduced to 13.0° C. or less. When the temperature difference ΔT is reduced, the bending of the reduced pressure double glazed glass panel by exposure to solar radiation is reduced. According to the present invention, it is possible to provide a reduced pressure double glazed glass panel having sufficient heat insulating and heat shielding properties and being less susceptible to bending when exposed to solar radiation.

DESCRIPTION OF EMBODIMENTS

Hereinafter, embodiments of the present invention are described with reference to the accompanying drawings. The following description is merely exemplary embodiments of the present invention, and the present invention is not limited by these embodiments. As used in this description, the "main component" refers to the component whose mass content is the highest.

In a reduced pressure double glazed glass panel 1 according to an embodiment of the present invention, an outside glass sheet 2, an inside glass sheet 3, and a gap portion 4 are joined together, and the outside glass sheet 2 and the inside glass sheet 3 are sealed along their peripheries by a peripheral sealing portion made of a hard sealing material containing a low melting glass or a metal solder (not shown) so as to seal the gap portion 4 under reduced pressure.

Figure 1:
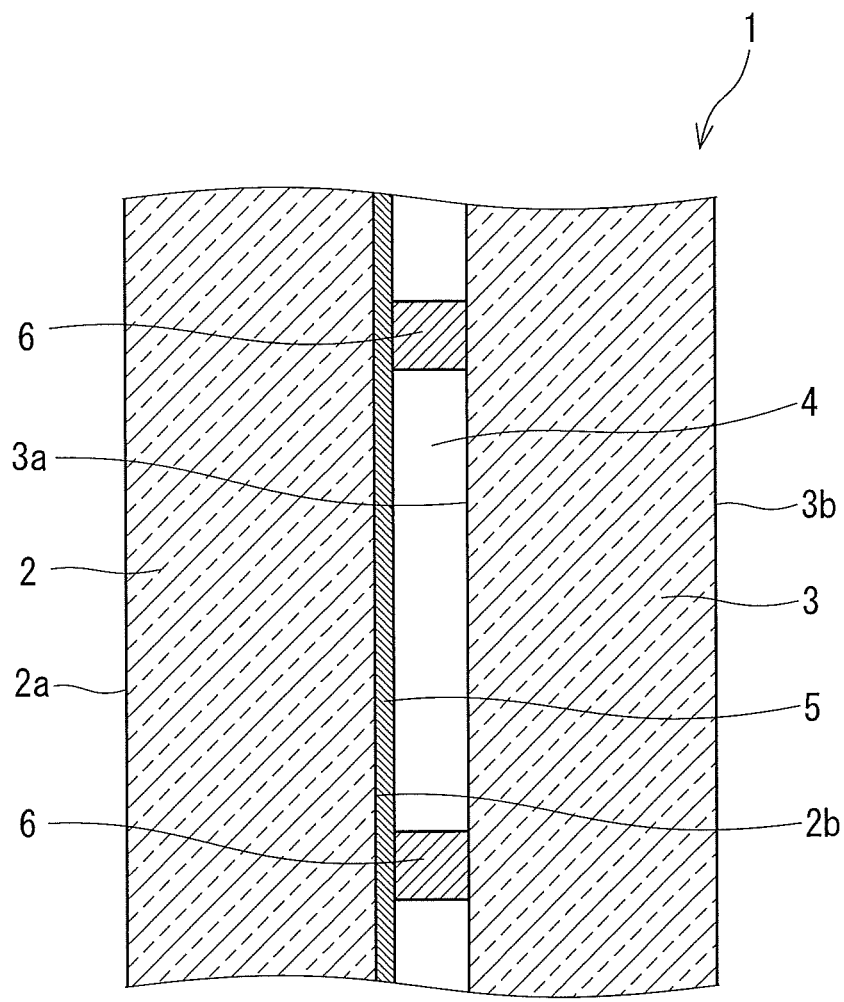
FIG. 1 is a cross-sectional view of a reduced pressure double glazed glass panel according to an embodiment of the present invention.

As shown in FIG. 1, the outside glass sheet 2 is a glass sheet provided to face an outdoor space, and the inside glass sheet 3 is a glass sheet provided to be separated from the outside glass sheet 2 with a predetermined gap therebetween and to face an indoor space. The gap portion 4 sealed under reduced pressure is formed between the outside glass sheet 2 and the inside glass sheet 3. The outside glass sheet 2 has a first surface 2a disposed to face the outdoor space and a second surface 2b disposed to face the gap portion 4. The inside glass sheet 3 has a third surface 3a disposed to face the gap portion 4 and a fourth surface 3b disposed to face the indoor space. A Low-E film 5 is formed on the second surface 2b of the outside glass sheet 2.

This reduced pressure double glazed glass panel 1 is produced as follows. First, the outside glass sheet 2 and the inside glass sheet 3 made of float glass or the like as a material are prepared, and the Low-E film 5 is formed on the second surface 2b of the outside glass sheet 2 by reactive sputtering or the like. Next, spacers 6 (see FIG. 1) are inserted between the outside glass sheet 2 and the inside glass sheet 3. The spacer 6 is preferably made of a material having a compressive strength of $4.9 \times 10^8$ Pa or more, for example, a stainless steel (SUS304). It is preferable that the spacer 6 have a circular cylindrical shape with a diameter of about 0.3 mm to 1.0 mm and a height of about 0.15 mm to 1.0 mm and that the distance between the adjacent spacers be about 20 mm. Then, the pair of the outside glass sheet 2 and the inside glass sheet 3, with the spacers 6 sandwiched therebetween, are sealed along their peripheries with a low melting glass or the like so as to form the gap portion 4 between the outside glass sheet 2 and the inside glass sheet 3. Then, air in the gap portion 4 is evacuated to reduce the pressure therein and sealed to provide a reduced pressure environment, for example, at a pressure of 1.33 Pa or less.

Preferably, the outside glass sheet 2 has a visible light reflectance $R_{G(vis)}$ of 30% or less as measured on the first surface 2a. Preferably, the outside glass sheet 2 has a reflected color with an a*value of 10 or less and a b*value of 10 or less in the L*a*b*color space as measured on the first surface 2a. More preferably, the outside glass sheet 2 has the reflected color with an a value of −5 or more and 5 or less and a b*value of 10 or less in the L*a*b*color space as measured on the first surface 2a.

Figure 2:
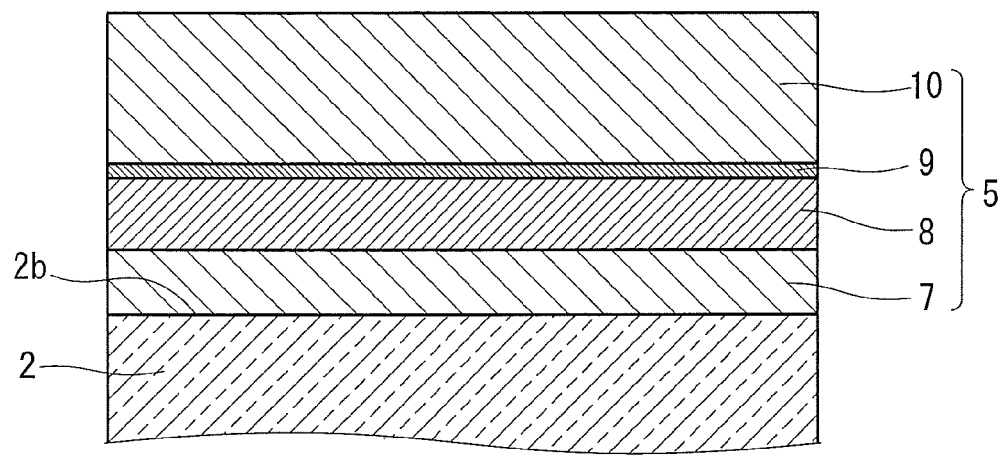
FIG. 2 is a cross-sectional view of a multilayer structure of a Low-E film shown in FIG. 1.

As shown in FIG. 2, the Low-E film 5 is, for example, a stack of a lower dielectric layer 7, a metal layer 8, a sacrifice layer 9, and an upper dielectric layer 10, which are stacked in this order on the second surface 2b. It is recommended to use silver as a metal for the metal layer 8, but silver doped with another metal such as palladium, gold, indium, zinc, tin, aluminum, copper, or the like can also be used preferably. Preferably, the main component of the material used in the lower dielectric layer 7 and the upper dielectric layer 10 is at least one selected from oxides of zinc, tin, titanium, indium, and niobium. At least one of the lower dielectric layer 7 and the upper dielectric layer 10 may be a stack of two or more layers. This stack may contain a nitride layer or an oxynitride layer containing at least one metal selected from silicon, aluminum, and titanium.

The Low-E film 5 has an emissivity ∈ of 0.067 or less, preferably 0.063 or less. The outside glass sheet 2 has a solar reflectance $R_{G(solar)}$ of 31% or more, preferably 32% or more, and more preferably 33% or more, as measured on the first surface 2a facing the outdoor space. The solar reflectance $R_{G(solar)}$ is 40% or less, preferably 38% or less, and more preferably 35% or less, as measured on the first surface 2a. The outside glass sheet 2 has a solar absorptance $A_{G(solar)}$ of $(48-R_{G(solar)})$% or more and 17% or less as measured on the first surface 2a. Preferably, the solar absorptance $A_{G(solar)}$ satisfies the above relation $(48-R_{G(solar)})\% \leq A_{G(solar)} \leq 17\%$ and is 14% or more. When the solar reflectance $R_{G(solar)}$ is 31% or more and 40% or less, the solar absorptance $A_{G(solar)}$ is 8% or more and 17% or less. Since the total percentage of the solar absorptance $A_{G(solar)}$, the solar reflectance $R_{G(solar)}$, and the solar transmittance $T_{(solar)}$ is 100%, the solar transmittance $T_{(solar)}$ of the outside glass sheet 2 is 52% or less. Furthermore, the reduced pressure double glazed glass panel 1 has a solar heat gain coefficient SHGC of 0.50 or less and a thermal transmittance U value of 1.2 W/m²·K or less. Preferably, the solar absorptance $A_{G(solar)}$ is $\{18.3-(0.07 \times R_{G(solar)})+(20 \times \in)\}$% or less.

In this case, it is easy to reduce the temperature difference ΔT between the outside glass sheet 2 and the inside glass sheet 3 to 13.0° C. or less under the above-mentioned summertime solar radiation conditions. Therefore, it is possible to sufficiently prevent the bending of the outside glass sheet 2 and the inside glass sheet 3 when exposed to solar radiation. More preferably, the solar absorptance $A_{G(solar)}$ is $\{17.3-(0.07 \times R_{G(solar)})+(20 \times \in)\}\%$ or less. In this case, it is easy to reduce the temperature difference ΔT between the outside glass sheet 2 and the inside glass sheet 3 to 12.5° C. or less under the above-mentioned summertime solar radiation conditions and thus it is possible to prevent the bending of the panel more reliably.

As shown in FIG. 2, the sacrifice layer 9 is formed between the metal layer 8 and the upper dielectric layer 10. When the upper dielectric layer 10 is formed by reactive sputtering or in the heating step of the production of the reduced pressure double glazed glass panel, the sacrifice layer 9 consisting of a metal or a metal oxide itself is oxidized so as to prevent oxidation of the metal layer 8. Specific examples of the material of the sacrifice layer 9 include metals such as titanium, zinc, nickel, chromium, zinc/aluminum alloy, niobium, and stainless steel, alloys of these metals, and oxides thereof. Preferably, the sacrifice layer 9 is a layer containing, as a main component, at least one metal material selected from titanium, zinc, nickel, chromium, niobium, and stainless steel or an oxide of the metal material.

Specifically, it is preferable that the metal layer 8 be a layer containing silver as a main component. It is preferable that the sacrifice layer 9 be a layer containing titanium oxide as a main component. It is preferable that the lower dielectric layer 7 and the upper dielectric layer 10 each include one or more amorphous layers and one or more crystalline layers. The thickness of the lower dielectric layer 7 is preferably 5 nm or more and 40 nm or less, and more preferably 10 nm or more and 30 nm or less. The thickness of the metal layer 8 is preferably 11 nm or more and 16 nm or less. The thickness of the upper dielectric layer 10 is preferably 30 nm or more and 70 nm or less, and more preferably 43 nm or more and 60 nm or less. These thicknesses are determined to achieve both high heat shielding performance and low visible light reflectance.

The thickness of the sacrifice layer 9 is, for example, 0.5 nm or more and 15 nm or less, preferably 2 nm or more and 10 nm or less, more preferably 2 nm or more and 8 nm or less, and even more preferably 2 nm or more and 6 nm or less. Furthermore, as a measure of the light absorption of the Low-E film 5, the visible light absorptance $A_{F(vis)}$ of the outside glass sheet 2 on which the Low-E film 5 is formed is preferably 12% or less as measured on the surface of the Low-E film 5. The visible light absorptance $A_{F(vis)}$ is the ratio of absorption of visible light incident on the surface of the Low-E film 5 (film surface) by the Low-E film 5 and the outside glass sheet 2 to the total incident visible light. When a metal layer as the sacrifice layer 9 is formed and the upper dielectric layer 10 is formed on the sacrifice layer 9, the sacrifice layer 9 is partially oxidized and thereby oxidation of the metal layer 8 can be prevented. The higher the degree of oxidation of the sacrifice layer 9 is, the lower the visible light absorptance $A_{F(vis)}$ is. When the visible light absorptance $A_{F(vis)}$ is as low as 12% or less, the temperature rise in the outside glass sheet 2 can be reduced.

Preferably, the 400 nm wavelength light absorptance $A_{F(400)}$ of the outside glass sheet 2 on which the Low-E film 5 is formed is 14% or less as measured on the surface of the Low-E film 5. The 400 nm wavelength light absorptance $A_{F(400)}$ can be regarded as a measure of the ultraviolet absorption of the Low-E film 5, regardless of the optical properties of the outside glass sheet 2. When the 400 nm wavelength light absorptance $A_{F(400)}$ is as low as 14% or less, the temperature rise in the outside glass sheet 2 can be reduced.

Preferably, the lower dielectric layer 7 includes one or more amorphous layers and one or more crystalline layers. Preferably, the metal layer 8 is formed in contact with the crystalline layer included in the lower dielectric layer 7. The crystalline layer included in the lower dielectric layer 7 improves the crystallinity of the metal layer 8 formed directly on the crystalline layer and thus improves the performance of the Low-E film 5. However, if the lower dielectric layer 7 includes a crystalline layer only, as the thickness thereof is increased, the size of crystal grains in the crystalline layer increases and the surface roughness of the crystalline layer also increases, and as a result, the crystallinity of the metal layer 8 decreases. In order to prevent this decrease in the crystallinity, it is recommended that the lower dielectric layer 7 include an amorphous layer. Since the surface of the amorphous layer is relatively smooth, the increase in the surface roughness of the crystalline layer formed on the amorphous layer can be prevented. Preferably, the upper dielectric layer 10 is a layer including one or more amorphous layers and one or more crystalline layers. It is preferable that an amorphous layer be located at the outermost position in the upper dielectric layer 10 (on the opposite side from the glass surface side). Generally, an amorphous layer is harder than a crystalline layer and is suitable for preventing entry of water into the upper dielectric layer 10. Therefore, the upper dielectric layer 10 including an amorphous layer located at the outermost position is suitable for improving the durability of the Low-E film 5.

The lower dielectric layer 7 is, for example, a stack of a first amorphous tin-zinc oxide layer and a first crystalline layer containing zinc oxide as a main component, which are stacked in this order. The upper dielectric layer 10 is a stack of a second crystalline layer containing zinc oxide as a main component, a second amorphous tin-zinc oxide layer, and an amorphous layer containing silicon nitride as a main component, which are stacked in this order. In this layered structure, the thickness of the lower dielectric layer 7 is preferably 10 nm or more and 30 nm or less. In order to obtain the above-mentioned effect, it is preferable that the thickness of the first crystalline layer containing zinc oxide as a main component be 3 nm or more and 9 nm or less. Preferably, the metal layer 8 is a layer consisting of silver and having a thickness of 13 nm or more and 16 nm or less. Preferably, the sacrifice layer 9 is a layer consisting of an oxide of titanium and having a thickness of 2 nm or more and 6 nm or less. The thickness of the upper dielectric layer 10 is preferably 43 nm or more and 60 nm or less. In order to obtain the above-mentioned effect of a low light absorptance $A_{F(400)}$, it is preferable that the thickness of the second crystalline layer containing zinc oxide as a main component be 4 nm or more and 15 nm or less. In order to obtain the above-mentioned effect on the durability, it is preferable that the thickness of the amorphous layer containing silicon nitride as a main component be 6 nm or more. The thicknesses of the first amorphous tin-zinc oxide layer and the second amorphous tin-zinc oxide layer each can be arbitrarily set so that the thicknesses of the lower dielectric layer 7 and the upper dielectric layer 10 each fall within a preferable range.

As another film structure of the lower dielectric layer 7, an amorphous layer containing silicon nitride as a main component may be used instead of the first amorphous tin-zinc oxide layer.

As another film structure of the upper dielectric layer 10, a structure including two or more crystalline layers containing zinc oxide as a main component and two or more amorphous layers containing silicon nitride as a main component may be used. In this case, it is preferable that the two or more amorphous layers containing silicon nitride as a main component be arranged to sandwich therebetween one of the two or more crystalline layers containing zinc oxide as a main component. In a specific example of this film structure, the lower dielectric layer is a stack of a first amorphous tin-zinc oxide layer and a first crystalline layer containing zinc oxide as a main component, which are stacked in this order, and the upper dielectric layer is a stack of a second crystalline layer containing zinc oxide as a main component, a second amorphous tin-zinc oxide layer, a first amorphous layer containing silicon nitride as a main component, a third crystalline layer containing zinc oxide as a main component, and a second amorphous layer containing silicon nitride as a main component, which are stacked in this order.

Also in this layered structure, the thickness of the upper dielectric layer 10 is preferably 43 nm or more and 60 nm or less. In order to obtain the above-mentioned effect of a 400 nm wavelength light absorptance $A_{F(400)}$, it is preferable that the total thickness of the two or more crystalline layers containing zinc oxide as a main component be 4 nm or more and 15 nm or less. The thicknesses of the two or more crystalline layers containing zinc oxide as a main component each can be arbitrarily set so that the thickness of the upper dielectric layer 10 fall within a preferable range. It is preferable that, in the two or more amorphous layers containing silicon nitride as a main component, the layer stacked as the outermost layer of the upper dielectric layer 10 be 6 nm or more in order to obtain the above-mentioned effect on the durability. The thicknesses of the layers other than the layer stacked as the outermost layer of the upper dielectric layer 10, that is, the thicknesses of the other one or more amorphous layers containing silicon nitride as a main component each can be arbitrarily set so that the thickness of the upper dielectric layer 10 fall within a preferable range.

Still another film structure may be designed so that the thickness of the lower dielectric layer 7 be 10 nm or more and 25 nm or less, the thickness of the metal layer 8 be 11 nm or more and 13 nm or less, the thickness of the sacrifice layer 9 be 2 nm or more and 10 nm or less, and the thickness of the upper dielectric layer 10 be 35 nm or more and 45 nm or less.

As a modification, a functional film that does not substantially affect the optical properties of the outside glass sheet 2 on which the Low-E film 5 is formed may be formed on the first surface 2a of the outside glass sheet 2. Examples of the functional film include a water-repellent film and a low-maintenance coating. The water-repellent film is, for example, a film formed by applying a solution containing a silane coupling agent having a fluoroalkyl chain and drying the solution. The low-maintenance coating is, for example, a film formed by stacking a layer containing silicon oxide as a main component and having a thickness of 5 nm or more and 15 nm or less and a layer containing titanium oxide as a main component and having a thickness of 2 nm or more and 5 nm or less in this order on the first surface 2a.

Figure 3:
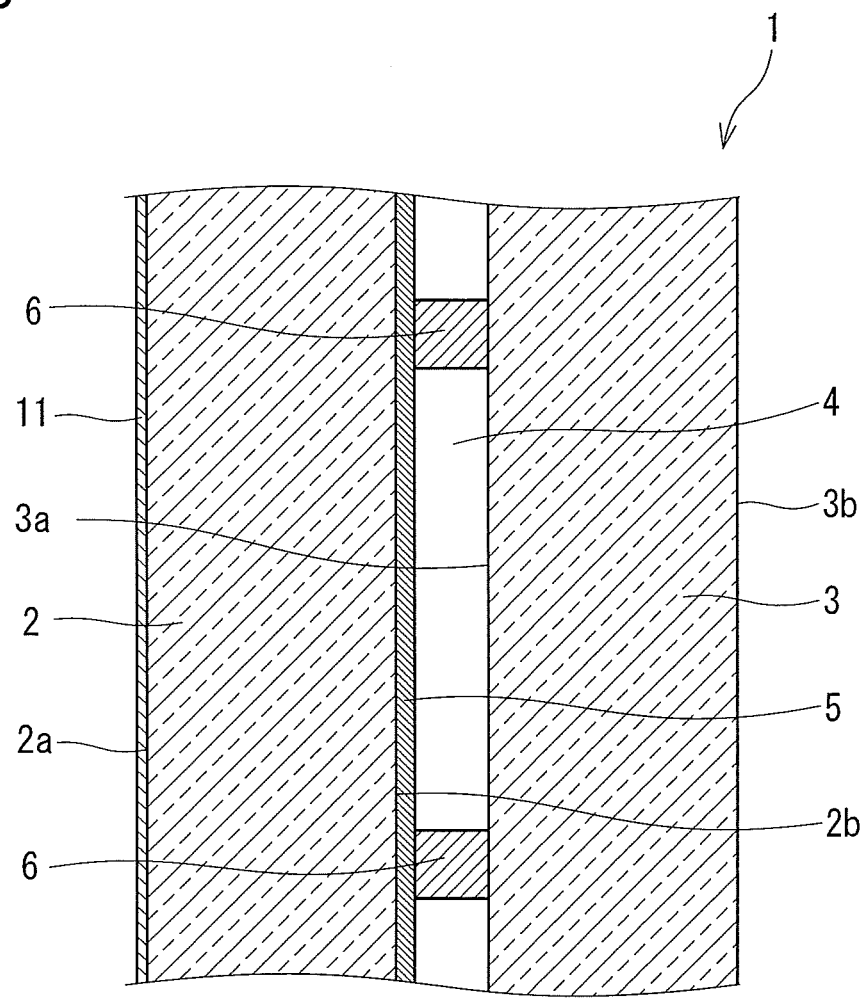
FIG. 3 is a cross-sectional view of a reduced pressure double glazed glass panel according to a modification of the present invention.

As another modification, as a layer that affects the optical properties of the outside glass sheet 2 on which the Low-E film 5 is formed, a reflective layer 11 may be formed on the first surface 2a of the outside glass sheet 2, as shown in FIG. 3. When this reflective layer 11 is formed, the amount of solar radiation reflected from the first surface 2a of the outside glass sheet 2 increases and the amount of solar radiation absorbed by the outside glass sheet 2 decreases, and thereby the temperature rise in the outside glass sheet 2 can be reduced. It is preferable that the refractive index nd of the reflective layer 11 is 1.8 or more as measured using the emission line of a sodium lamp as a light source and the thickness of the reflective layer 11 is 14 nm or more and 55 nm or less. The reflective layer 11 may include two or more layers having different compositions.

Next, the performance of the reduced pressure double glazed glass panel of the present invention is described with reference to specific examples and comparative examples.

Example 1

A 3.1 mm-thick outside glass sheet 2 on which a Low-E film 5 was formed was cut into a predetermined size, and a 3.1 mm-thick float glass sheet was prepared as an inside glass sheet 3. Stainless steel cylindrical spacers 6 with a diameter of 0.5 mm and a height of 0.2 mm were inserted between the pair of the outside glass sheet 2 and the inside glass sheet 3, these outside glass sheet 2 and the inside glass sheet 3 were sealed all along the peripheries thereof with a low melting glass to form a gap portion 4 therebetween, and then the gap portion 4 was evacuated to reduce the pressure therein. Thus, a reduced pressure double glazed glass panel 1 was obtained.

The Low-E film 5 was formed on the second surface 2b of the outside glass sheet 2 by reactive sputtering. The Low-E film 5 was formed by stacking a lower dielectric layer 7, a metal layer 8, a sacrifice layer 9, and an upper dielectric layer 10, each composed of a material shown in Table 1 and having a thickness shown in Table 1, in this order. More specifically, the lower dielectric layer 7 is a layer formed by stacking a tin-zinc oxide (ZnSnO) layer (amorphous layer) and a tin-doped zinc oxide (ZnO:Sn) layer (crystalline layer) in this order. The metal layer 8 is an Ag layer. The sacrifice layer 9 is a titanium oxide (TiO$_x$ (0≤x≤2)) layer. The upper dielectric layer 10 is a layer formed by stacking a ZnO:Sn layer, a ZnSnO layer, and an aluminum-doped silicon nitride (SiN:Al) layer (amorphous layer) in this order.

TABLE 1

| | Coating on first surface | Coating on second surface | | |
| --- | --- | --- | --- | --- |
| | | Lower dielectric layer | Metal layer | Sacrifice layer |
| Ex. 1 | | ZnSnO 5 nm   ZnO:Sn 5 nm | Ag 13 nm | TiOx 3 nm |
| Ex. 2 | | ZnSnO 5 nm   ZnO:Sn 5 nm | Ag 13 nm | TiOx 10 nm |
| Ex. 3 | | ZnSnO 5 nm   ZnO:Sn 5 nm | Ag 13 nm | TiOx 4 nm |
| Ex. 4 | | ZnSnO 5 nm   ZnO:Sn 5 nm | Ag 13 nm | TiOx 5 nm |

TABLE 1-continued

|  |  |  |  |  |  |  |
|---|---|---|---|---|---|---|
| Ex. 5 |  |  | ZnSnO 5 nm | ZnO:Sn 5 nm | Ag 13 nm | TiOx 4 nm |
| Ex. 6 |  |  | ZnSnO 17 nm | ZnO:Sn 5 nm | Ag 13 nm | TiOx 3 nm |
| Ex. 7 |  |  | ZnSnO 5 nm | ZnO:Sn 5 nm | Ag 13 nm | TiOx 6 nm |
| Ex. 8 |  |  | ZnSnO 5 nm | ZnO:Sn 5 nm | Ag 13 nm | TiOx 6 nm |
| Ex. 9 |  |  | ZnSnO 5 nm | ZnO:Sn 5 nm | Ag 12 nm | TiOx 6 nm |
| Ex. 10 |  |  | ZnSnO 14 nm | ZnO:Sn 5 nm | Ag 14 nm | TiOx 4 nm |
| Ex. 11 |  |  | ZnSnO 5 nm | ZnO:Sn 5 nm | Ag 15 nm | TiOx 5 nm |
| Ex. 12 |  |  | ZnSnO 30 nm | ZnO:Sn 5 nm | Ag 16 nm | TiOx 4 nm |
| Ex. 13 |  |  | ZnSnO 10 nm | ZnO:Sn 6 nm | Ag 15 nm | TiOx 6 nm |
| Ex. 14 |  |  | ZnSnO 16 nm | ZnO:Sn 6 nm | Ag 14 nm | TiOx 4 nm |
| Ex. 15 |  |  | SiN:Al 16 nm | ZnO:Sn 6 nm | Ag 14 nm | TiOx 5 nm |
| Ex. 16 |  | TiO2 4 nm | SiO2 9 nm ZnSnO 5 nm | ZnO:Sn 5 nm | Ag 13 nm | TiOx 4 nm |
| Ex. 17 | TiO2 5 nm | ZrO2 10 nm | SiO2 9 nm ZnSnO 5 nm | ZnO:Sn 5 nm | Ag 13 nm | TiOx 6 nm |
| Ex. 18 |  |  | SiN 30 nm ZnSnO 5 nm | ZnO:Sn 5 nm | Ag 12 nm | TiOx 6 nm |
| Ex. 19 |  |  | SiN 40 nm ZnSnO 5 nm | ZnO:Sn 5 nm | Ag 11 nm | TiOx 5 nm |
| Ex. 20 |  |  | SiN 50 nm ZnSnO 10 nm | ZnO:Sn 5 nm | Ag 11 nm | TiOx 5 nm |
| Ex. 21 |  |  | SiN 40 nm ZnSnO 17 nm | ZnO:Sn 5 nm | Ag 12 nm | TiOx 5 nm |
| Ex. 22 |  | SiO2 14 nm | SiN 35 nm ZnSnO 17 nm | ZnO:Sn 5 nm | Ag 12 nm | TiOx 5 nm |
| Ex. 23 |  | TiO2 4 nm | SiN 32 nm ZnSnO 17 nm | ZnO:Sn 5 nm | Ag 12 nm | TiOx 5 nm |
| C. Ex. 1 |  |  |  | ZnSnO 16 nm | ZnO:Sn 6 nm | Ag 14 nm | TiOx 10 nm |
| C. Ex. 2 |  |  |  | ZnSnO 11 nm | ZnO:Sn 6 nm | Ag 10 nm | TiOx 4 nm |
| C. Ex. 3 |  |  |  |  | ZnO 30 nm | Ag 15 nm | TiOx 7 nm |
| C. Ex. 4 |  |  |  |  | ZnO 10 nm | Ag 10 nm | TiOx 7 nm |
| C. Ex. 5 |  |  |  |  | ZnO 90 nm | Ag 14 nm | TiOx 7 nm |
| C. Ex. 6 |  |  |  |  | ZnO 60 nm | Ag 15 nm | TiOx 7 nm |
| C. Ex. 7 |  |  |  |  | ZnO 30 nm | Ag 18 nm | TiOx 7 nm |
| C. Ex. 8 |  |  |  |  | ZnO 20 nm | Ag 13 nm | TiOx 7 nm |

Coating on second surface

Upper dielectric layer

|  |  |  |  |  |  |
|---|---|---|---|---|---|
| Ex. 1 | ZnO:Sn 5 nm | ZnSnO 23 nm | SiN:Al 16 nm |  |  |
| Ex. 2 | ZnO:Sn 5 nm | ZnSnO 23 nm | SiN:Al 16 nm |  |  |
| Ex. 3 | ZnO:Sn 5 nm | ZnSnO 23 nm | SiN:Al 16 nm |  |  |
| Ex. 4 | ZnO:Sn 5 nm | ZnSnO 18 nm | SiN:Al 16 nm |  |  |
| Ex. 5 | ZnO:Sn 5 nm | ZnSnO 28 nm | SiN:Al 16 nm |  |  |
| Ex. 6 | ZnO:Sn 5 nm | ZnSnO 38 nm | SiN:Al 16 nm |  |  |
| Ex. 7 | ZnO:Sn 20 nm | ZnSnO 8 nm | SiN:Al 16 nm |  |  |
| Ex. 8 | ZnO:Sn 34 nm | SiN:Al 10 nm |  |  |  |
| Ex. 9 | ZnO:Sn 5 nm | ZnSnO 23 nm | SiN:Al 29 nm |  |  |
| Ex. 10 | ZnO:Sn 5 nm | ZnSnO 23 nm | SiN:Al 16 nm |  |  |
| Ex. 11 | ZnO:Sn 5 nm | ZnSnO 23 nm | SiN:Al 16 nm |  |  |
| Ex. 12 | ZnO:Sn 5 nm | ZnSnO 34 nm | SiN:Al 16 nm |  |  |
| Ex. 13 | ZnO:Sn 5 nm | ZnSnO 16 nm | SiN:Al 9 nm | ZnO:Sn 9 nm | SiN:Al 9 nm |
| Ex. 14 | ZnO:Sn 5 nm | ZnSnO 25 nm | SiN:Al 9 nm | ZnO:Sn 9 nm | SiN:Al 9 nm |
| Ex. 15 | ZnO:Sn 5 nm | ZnSnO 16 nm | SiN:Al 9 nm | ZnO:Sn 9 nm | SiN:Al 9 nm |
| Ex. 16 | ZnO:Sn 5 nm | ZnSnO 23 nm | SiN:Al 16 nm |  |  |
| Ex. 17 | ZnO:Sn 5 nm | ZnSnO 23 nm | SiN:Al 14 nm |  |  |
| Ex. 18 | ZnO:Sn 5 nm | ZnSnO 23 nm | SiN:Al 9 nm |  |  |
| Ex. 19 | ZnO:Sn 5 nm | ZnSnO 23 nm | SiN:Al 9 nm |  |  |
| Ex. 20 | ZnO:Sn 5 nm | ZnSnO 23 nm | SiN:Al 9 nm |  |  |
| Ex. 21 | ZnO:Sn 5 nm | ZnSnO 23 nm | SiN:Al 9 nm |  |  |
| Ex. 22 | ZnO:Sn 5 nm | ZnSnO 23 nm | SiN:Al 9 nm |  |  |
| Ex. 23 | ZnO:Sn 5 nm | ZnSnO 23 nm | SiN:Al 9 nm |  |  |
| C. Ex. 1 | ZnO:Sn 5 nm | ZnSnO 16 nm | SiN:Al 9 nm | ZnO:Sn 9 nm | SiN:Al 9 nm |
| C. Ex. 2 | ZnO:Sn 5 nm | ZnSnO 16 nm | SiN:Al 9 nm | ZnO:Sn 9 nm | SiN:Al 9 nm |
| C. Ex. 3 | ZnO 45 nm | SiN 5 nm |  |  |  |
| C. Ex. 4 | ZnO 7 nm | SiN 3 nm |  |  |  |
| C. Ex. 5 | ZnO 45 nm | SiN 5 nm |  |  |  |
| C. Ex. 6 | ZnO 55 nm | SiN 5 nm |  |  |  |
| C. Ex. 7 | ZnO 45 nm | SiN 5 nm |  |  |  |
| C. Ex. 8 | ZnO 35 nm | SiN 5 nm |  |  |  |

The reduced pressure double glazed glass panel 1 obtained as described above was evaluated under the following conditions.

The conditions (1) for an experimental house were set to simulate the summertime solar radiation conditions (solar radiation heat flux: 700 kcal/m²h (814 W/m²), outdoor temperature: 35° C., indoor temperature: 25° C.). 10 minutes after the start of the measurement, the thermal transmittance U value (W/m²·K) and the temperature difference ΔT (° C.) between the outside glass sheet 2 and the indoor glass sheet 3 were measured. The visible light transmittance $T_{(vis)}$ (%) measured on the outside glass sheet 2, the visible light reflectance $R_{G(vis)}$ (%) measured on the first surface 2a, the visible light absorptance $A_{G(vis)}$ (%) measured on the first surface 2a, the solar transmittance $T_{(solar)}$ (%) measured on the outside glass sheet 2, the solar reflectance $R_{G(solar)}$ (%) measured on the first surface 2a, the solar absorptance $A_{G(solar)}$ (%) measured on the first surface 2a, the visible light reflectance $R_{F(vis)}$ (%) measured on the surface of the Low-E film 5, the visible light absorptance $A_{F(vis)}$ (%) measured on the surface of the Low-E film 5, the 400 nm wavelength absorptance $A_{F(400)}$ (%) measured on the surface of the Low-E film 5, the solar reflectance $R_{F(solar)}$ (%) measured on the surface of the Low-E film 5, the solar absorptance $A_{F(solar)}$ (%) measured on the surface of the Low-E film 5, the emissivity $\in$ of the Low-E film 5, and the solar heat gain coefficient SHGC were calculated from the measurement results of the optical properties of the outside glass sheet 2 and the inside glass sheet 3 according to Japanese Industrial Standards (JIS) R 3106 (Testing methods on transmittance, reflectance and emission of flat glasses and evaluation of solar heat gain coefficient). The reflected color a*value and b*value in the L*a*b*color space as measured on the first surface 2a were calculated relative to the standard illuminant $D_{65}$ according to JIS Z 8722 (Methods of colour measurement—Reflecting and transmitting objects) and JIS Z 8729 (Colour specification—CIELAB and CIELUV color spaces). Furthermore, the degree of bending of the outside glass sheet 2 was rated as follows. The degree of bending was rated "low" when the temperature difference $\Delta T$ (° C.) between the outside glass sheet 2 and the inside glass sheet 3 satisfied $\Delta T$ (° C.)≤12.5 (° C.), rated "moderate" when the temperature difference $\Delta T$ (° C.) satisfied 12.5 (° C.)≤$\Delta T$ (° C.)≤13.0 (° C.), and rated "high" when the temperature difference $\Delta T$ (° C.) satisfied $\Delta T$ (° C.)≥13.0 (° C.). Table 2 shows these results.

TABLE 2

|  | Visible light transmittance % | Glass-surface visible light reflectance % | Glass-surface visible light absorptance % | Solar transmittance % | Glass-surface solar reflectance % | Glass-surface solar absorptance % | Glass-surface reflected color a* | Glass-surface reflected color b* | Film-surface visible light reflectance % | Film-surface visible light absorptance % |
|---|---|---|---|---|---|---|---|---|---|---|
| Example | | | | | | | | | | |
| 1 | 77.6 | 18.2 | 4.2 | 51.6 | 33.9 | 14.5 | −0.1 | −16.3 | 15.3 | 7.1 |
| 2 | 70.6 | 25.1 | 4.3 | 50.8 | 34.6 | 14.6 | −5.4 | −13.0 | 21.4 | 8.0 |
| 3 | 74.6 | 19.3 | 6.1 | 49.8 | 34.2 | 16.0 | −0.5 | −15.5 | 13.8 | 11.6 |
| 4 | 80.2 | 14.3 | 6.5 | 51.1 | 33.6 | 15.3 | 5.3 | −15.9 | 10.8 | 9.0 |
| 5 | 71.9 | 23.6 | 4.5 | 50.5 | 34.8 | 14.7 | −4.0 | −13.7 | 19.9 | 8.2 |
| 6 | 67.1 | 28.7 | 4.2 | 51.7 | 33.8 | 14.5 | −7.0 | −4.4 | 25.8 | 7.1 |
| 7 | 76.5 | 18.2 | 5.3 | 50.6 | 34.2 | 15.2 | 0.6 | −15.8 | 14.1 | 9.4 |
| 8 | 76.3 | 17.9 | 5.8 | 50.4 | 34.2 | 15.4 | 1.8 | −15.7 | 13.4 | 10.3 |
| 9 | 65.2 | 29.8 | 5.0 | 51.7 | 33.2 | 15.1 | −7.1 | −7.6 | 25.2 | 9.6 |
| 10 | 78.4 | 16.5 | 5.1 | 51.1 | 33.7 | 15.2 | 0.1 | −13.1 | 13.1 | 8.5 |
| 11 | 73.5 | 21.4 | 5.1 | 46.7 | 38.0 | 15.3 | 1.1 | −13.9 | 17.4 | 9.1 |
| 12 | 71.5 | 23.8 | 4.7 | 48.6 | 36.1 | 15.3 | −3.1 | −10.0 | 21.0 | 7.5 |
| 13 | 72.2 | 22.4 | 5.4 | 46.9 | 38.0 | 15.1 | −0.7 | −13.2 | 18.3 | 9.5 |
| 14 | 68.5 | 26.6 | 4.9 | 49.9 | 35.5 | 14.6 | −5.4 | −7.0 | 23.5 | 8.0 |
| 15 | 76.9 | 17.8 | 5.3 | 51.2 | 33.9 | 14.9 | −1.4 | −13.2 | 14.3 | 8.8 |
| 16 | 76.4 | 18.6 | 4.8 | 50.8 | 34.2 | 15.0 | −0.3 | −16.1 | 15.0 | 8.6 |
| 17 | 76.0 | 19.0 | 5.0 | 50.9 | 34.2 | 14.9 | −1.0 | −16.5 | 14.8 | 9.2 |
| 18 | 76.4 | 18.4 | 5.2 | 50.8 | 34.5 | 14.7 | 3.0 | −15.4 | 14.4 | 9.2 |
| 19 | 74.1 | 21.1 | 4.8 | 51.5 | 34.2 | 14.3 | 0.9 | −14.3 | 16.9 | 9.0 |
| 20 | 72.4 | 22.9 | 4.7 | 51.7 | 34.3 | 14.0 | −0.5 | −11.3 | 18.6 | 9.0 |
| 21 | 75.5 | 19.5 | 5.0 | 51.4 | 34.0 | 14.6 | 0.7 | −11.7 | 15.5 | 9.0 |
| 22 | 76.0 | 19.0 | 5.0 | 51.7 | 33.7 | 14.6 | 0.8 | −11.5 | 15.1 | 8.9 |
| 23 | 76.1 | 18.8 | 5.1 | 51.7 | 33.6 | 14.7 | 0.9 | −12.6 | 15.0 | 8.9 |
| Comparative Examples | | | | | | | | | | |
| 1 | 72.7 | 19.2 | 8.1 | 48.6 | 34.1 | 17.3 | −1.9 | −11.4 | 12.0 | 15.3 |
| 2 | 79.9 | 15.2 | 4.9 | 60.0 | 26.1 | 13.9 | −4.7 | −14.7 | 12.1 | 8.0 |
| 3 | 78.4 | 13.7 | 7.9 | 49.3 | 31.1 | 19.6 | 3.9 | −10.4 | 9.8 | 11.8 |
| 4 | 74.0 | 15.4 | 10.6 | 49.2 | 31.4 | 19.4 | 6.5 | 25.4 | 17.1 | 8.9 |
| 5 | 73.1 | 18.7 | 8.2 | 49.6 | 31.2 | 19.2 | 4.4 | −27.3 | 16.1 | 10.8 |
| 6 | 73.2 | 19.0 | 7.8 | 49.7 | 31.2 | 19.1 | 1.9 | −20.7 | 16.6 | 10.2 |
| 7 | 72.8 | 18.5 | 8.7 | 42.3 | 36.9 | 20.8 | 10.7 | −0.5 | 14.5 | 12.7 |
| 8 | 82.8 | 8.5 | 8.7 | 52.0 | 29.1 | 18.9 | 11.3 | −9.2 | 5.9 | 11.3 |

|  | Film-surface λ 400 nm absorptance % | Film-surface solar reflectance % | Film-surface solar absorptance % | Emissivity | Solar heat gain coefficient | Thermal transmittance W/m2K | Glass sheet temperature difference ° C. | Degree of bending |
|---|---|---|---|---|---|---|---|---|
| Example | | | | | | | | |
| 1 | 9.0 | 39.0 | 9.4 | 0.046 | 0.49 | 1.2 | 11.8 | Low |
| 2 | 9.3 | 38.0 | 11.2 | 0.046 | 0.49 | 1.2 | 12.0 | Low |
| 3 | 12.2 | 37.4 | 12.8 | 0.044 | 0.48 | 1.2 | 12.6 | Moderate |
| 4 | 10.4 | 38.3 | 10.6 | 0.044 | 0.49 | 1.2 | 12.2 | Low |
| 5 | 9.8 | 38.6 | 10.9 | 0.044 | 0.48 | 1.2 | 12.0 | Low |
| 6 | 9.8 | 36.9 | 11.4 | 0.044 | 0.49 | 1.2 | 11.8 | Low |
| 7 | 12.3 | 38.4 | 11.0 | 0.044 | 0.48 | 1.2 | 12.2 | Low |
| 8 | 14.4 | 38.5 | 11.1 | 0.044 | 0.48 | 1.2 | 12.3 | Low |
| 9 | 11.6 | 34.6 | 13.7 | 0.052 | 0.49 | 1.2 | 12.1 | Low |
| 10 | 10.5 | 38.3 | 10.6 | 0.038 | 0.49 | 1.2 | 12.3 | Low |
| 11 | 10.3 | 43.0 | 10.3 | 0.034 | 0.44 | 1.1 | 12.5 | Low |
| 12 | 10.0 | 40.8 | 10.6 | 0.032 | 0.46 | 1.1 | 12.5 | Low |
| 13 | 12.0 | 42.9 | 10.2 | 0.034 | 0.45 | 1.1 | 12.4 | Low |

TABLE 2-continued

| | | | | | | | | |
|---|---|---|---|---|---|---|---|---|
| 14 | 11.6 | 39.4 | 10.7 | 0.039 | 0.48 | 1.2 | 12.1 | Low |
| 15 | 11.8 | 38.3 | 10.5 | 0.039 | 0.49 | 1.2 | 12.2 | Low |
| 16 | 10.0 | 38.3 | 10.9 | 0.044 | 0.49 | 1.2 | 12.1 | Low |
| 17 | 10.4 | 37.8 | 11.3 | 0.048 | 0.49 | 1.2 | 12.0 | Low |
| 18 | 11.6 | 38.0 | 11.2 | 0.050 | 0.49 | 1.2 | 11.9 | Low |
| 19 | 11.7 | 36.9 | 11.6 | 0.060 | 0.49 | 1.2 | 11.7 | Low |
| 20 | 11.8 | 36.3 | 12.0 | 0.063 | 0.49 | 1.2 | 11.6 | Low |
| 21 | 12.1 | 37.0 | 11.6 | 0.050 | 0.49 | 1.2 | 11.9 | Low |
| 22 | 11.9 | 36.8 | 11.5 | 0.050 | 0.49 | 1.2 | 11.9 | Low |
| 23 | 11.9 | 36.8 | 11.5 | 0.050 | 0.49 | 1.2 | 11.9 | Low |
| Comparative Examples | | | | | | | | |
| 1 | 16.5 | 36.5 | 14.9 | 0.039 | 0.46 | 1.2 | 13.3 | High |
| 2 | 11.5 | 28.6 | 11.4 | 0.039 | 0.58 | 1.3 | 11.3 | Low |
| 3 | 20.3 | 37.0 | 13.7 | 0.034 | 0.47 | 1.2 | 14.3 | High |
| 4 | 14.7 | 40.1 | 10.7 | 0.070 | 0.47 | 1.3 | 13.6 | High |
| 5 | 23.8 | 37.3 | 13.1 | 0.039 | 0.47 | 1.2 | 14.1 | High |
| 6 | 19.8 | 36.6 | 13.7 | 0.034 | 0.49 | 1.1 | 14.1 | High |
| 7 | 20.3 | 44.5 | 13.2 | 0.025 | 0.40 | 1.2 | 15.3 | High |
| 8 | 19.0 | 34.7 | 13.3 | 0.046 | 0.50 | 1.2 | 13.8 | High |

In Example 1, the visible light transmittance $T_{(vis)}$ is 77.6%. The visible light reflectance $R_{G(vis)}$ is 18.2%. The visible light absorptance $A_{G(vis)}$ is 4.2%. The solar transmittance $T_{(solar)}$ is 51.6%. The solar reflectance $R_{G(solar)}$ is 33.9%. The solar absorptance $A_{G(solar)}$ is 14.5%. The reflected color a*value is −0.1. The reflected color b*value is −16.3. The visible light reflectance $R_{F(vis)}$ is 15.3%. The visible light absorptance $A_{F(vis)}$ is 7.1%. The 400 nm wavelength absorptance $A_{F(400)}$ is 9.0%. The solar reflectance $R_{F(solar)}$ is 39.0%. The solar absorptance $A_{G(solar)}$ is 9.4%. The emissivity $\in$ is 0.046. The solar heat gain coefficient SHGC is 0.49. The thermal transmittance U value is 1.2 W/m²·K. The temperature difference ΔT between the outside glass sheet 2 and the indoor glass sheet 3 is 11.8° C. The degree of bending is low because of ΔT≤12.5° C. Accordingly, $(48-R_{G(solar)})$ is 14.1%. $\{18.3-(0.07\times R_{G(solar)})+(20\times\in)\}$ is 16.8%. $\{17.3-(0.07\times R_{G(solar)})+(20\times\in)\}$ is 15.8%. That is, the following relations hold: $\in$ (=0.46)≤0.067; 31≤$R_{G(solar)}$ (=33.9)≤40; $(48-R_{G(solar)})$≤$A_{G(solar)}$ (=14.5)≤17; $T_{(solar)}$ (=51.6)≤52; $A_{G(solar)}$ (=14.5)≤$\{17.3-(0.07\times R_{G(solar)})+(20\times\in)\}$ (=15.8); $A_{F(vis)}$ (=7.1)≤12; $A_{F(400)}$ (=9.0)≤14; SHGC (=0.49)≤0.50; and U value (=1.2)≤1.2. Here, since the above relations hold, the temperature difference ΔT between the outside glass sheet 2 and the inside glass sheet 3 is as small as 12.5° C. or less and thus the degree of bending is also low. Furthermore, the following relations also hold: $R_{G(vis)}$ (=18.2)≤30; −5≤a*(=−0.1)≤5; and b*(=−16.3)≤10. Accordingly, not only the outside glass sheet 2 allows more visible light to pass through, but also a reflected color particularly preferred for use in reduced pressure double glazed glass panels, such as a light blue color ranging from transparent to light blue green, can be easily obtained.

Examples 2 to 15

In Examples 2 to 15, the reduced pressure double glazed glass panels 1 were produced in the same manner as in Example 1. As shown in Table 1, in Examples 2 to 15, the layered structures of the lower dielectric layer 7, the metal layer 8, the sacrifice layer 9, and the upper dielectric layer 10, the materials of these layers, and the thicknesses thereof were varied from those of Example 1. In Examples 2 to 15, the reduced pressure double glazed glass panels 1 were evaluated in the same manner as in Example 1. Table 2 shows the evaluation results. In Examples 2 to 17, the following relations hold: $\in$≤0.067; 31≤$R_{G(solar)}$≤40; $(48-R_{G(solar)})$≤$A_{G(solar)}$≤17; $T_{(solar)}$≤52; $A_{G(solar)}$≤$\{17.3-(0.07\times R_{G(solar)})+(20\times\in)\}$; $A_{F(vis)}$≤12; $A_{F(400)}$≤14; SHGC≤0.50; and U value≤1.2. Here, since the above relations hold, the temperature difference ΔT between the outside glass sheet 2 and the inside glass sheet 3 is as small as 12.5° C. or less and thus the degree of bending is also low. Furthermore, in Examples 3, 5, 7, 8, 10 to 13, and 15, the following relations also hold: $R_{G(vis)}$≤30; −5≤a*≤5; and b*≤10. Accordingly, not only the outside glass sheet 2 allows more visible light to pass through, but also the above-mentioned preferable reflected color can be easily obtained.

Example 16

In Example 16, the reduced pressure double glazed glass panel 1 was produced in the same manner as in Example 1. As shown in Table 1, in Example 16, the layered structures of the lower dielectric layer 7, the metal layer 8, the sacrifice layer 9, and the upper dielectric layer 10, the materials of these layers, and the thicknesses thereof were varied from those of Example 1.

Furthermore, in Example 16, a low-maintenance coating (see paragraph 0021 of JP 2008-505842 T) as a functional film that does not affect the optical properties of the outside glass sheet 2 on which the Low-E film 5 is formed was formed on the first surface 2a of the outside glass sheet 2. In Example 16, the low-maintenance coating is a layer formed by stacking a silicon oxide ($SiO_2$) layer and a titanium oxide ($TiO_2$) layer in this order. The thickness of the $SiO_2$ layer is 9 nm, and the thickness of the $TiO_2$ layer is 4 nm. This means that the thickness of the $SiO_2$ layer is within a range of 5 nm or more and 15 nm or less, and the thickness of the $TiO_2$ layer is within a range of 2 nm or more and 5 nm or less.

In Example 16, the reduced pressure double glazed glass panel 1 was evaluated in the same manner as in Example 1. Table 2 shows the evaluation results. In Example 16, the following relations hold: $\in$≤0.067; 31≤$R_{G(solar)}$≤40; $(48-R_{G(solar)})$≤$A_{G(solar)}$≤17; $T_{(solar)}$≤52; $A_{G(solar)}$≤$\{17.3-(0.07\times R_{G(solar)})+(20\times\in)\}$; $A_{F(vis)}$≤12; $A_{F(400)}$≤14; SHGC≤0.50; and U value≤1.2. Here, since the above relations hold, the temperature difference ΔT between the outside glass sheet 2 and the inside glass sheet 3 is as small as 12.5° C. or less and thus the degree of bending is also low. Furthermore, the following relations also hold: $R_{G(vis)}$≤30; −5≤a*≤5; and b*≤10. Accordingly, not only the outside glass sheet 2 allows more visible light to pass through, but also the above-mentioned preferable reflected color can be obtained more easily.

Examples 17 to 23

In Examples 17 to 23, the reduced pressure double glazed glass panels 1 were produced in the same manner as in Example 1. As shown in Table 1, in Examples 17 to 23, the layered structures of the lower dielectric layer 7, the metal layer 8, the sacrifice layer 9, and the upper dielectric layer 10, the materials of these layers, and the thicknesses thereof were varied from those of Example 1.

Furthermore, in each of Examples 17 to 23, the reflective layer 11 that affects the optical properties of the outside glass sheet 2 on which the Low-E film 5 is formed is formed on the first surface 2a of the outside glass sheet 2. Examples 17 to 23 include the examples in which the reflective layer 11 includes two or more layers having different compositions, but in these examples, the reflective layer 11 does not include a stack of a silicon oxide ($SiO_2$) layer and a titanium oxide ($TiO_2$) layer in this order, unlike the coating of Example 16. The reflective layer 11 has a refractive index of 1.8 or more and a thickness of 14 nm or more and 55 nm or less. Since this reflective layer 11 is formed, the amount of solar radiation reflected from the first surface 2a of the outside glass sheet 2 increases and the amount of solar radiation absorbed by the outside glass sheet 2 decreases.

In Examples 17 to 23, the reduced pressure double glazed glass panels 1 were evaluated in the same manner as in Example 1. Table 2 shows the evaluation results. In Examples 18 to 25, the following relations hold: $\in \leq 0.067$; $31 \leq R_{G(solar)} \leq 40$; $(48-R_{G(solar)}) \leq A_{G(solar)} \leq 17$; $T_{(solar)} \leq 52$; $A_{G(solar)} \leq \{17.3-(0.07 \times R_{G(solar)})+(20 \times \in)\}$; $A_{F(vis)} \leq 12$; $A_{F(400)} \leq 14$; SHGC$\leq 0.50$; and U value$\leq 1.2$. Here, since the above relations hold, the temperature difference $\Delta T$ between the outside glass sheet 2 and the inside glass sheet 3 is as small as 12.5° C. or less and thus the degree of bending is also low. Furthermore, the following relations also hold: $R_{G(vis)} \leq 30$; $-5 \leq a^* \leq 5$; and $b^* \leq 10$. Accordingly, not only the outside glass sheet 2 allows more visible light to pass through, but also the above-mentioned preferable reflected color can be obtained more easily.

Comparative Examples 1 to 8

In Comparative Examples 1 to 8, the reduced pressure double glazed glass panels 1 were produced in the same manner as in Example 1. As shown in Table 1, the Low-E film 5 was formed by stacking the lower dielectric layer 7, the metal layer 8, the sacrifice layer 9, and the upper dielectric layer 10 in this order. In Comparative Examples 1 to 8, the layered structures of the lower dielectric layer 7, the metal layer 8, the sacrifice layer 9, and the upper dielectric layer 10, the materials of these layers, and the thicknesses thereof were varied from those of Example 1. In Comparative Examples 1 to 8, the reduced pressure double glazed glass panels 1 were evaluated in the same manner as in Example 1. Table 2 shows these evaluation results. In Comparative Examples 1 to 8, the following relations do not hold: $(48-R_{G(solar)})\% \leq A_{G(solar)} \leq 17\%$; and $A_{G(solar)} \leq \{18.3-(0.07 \times R_{G(solar)})+(20 \times \in)\}\%$. Since the above relations do not hold in Comparative Examples 1, 3 to 8, the temperature difference $\Delta T$ between the outside glass sheet 2 and the inside glass sheet 3 is larger than 13.0° C. and thus the degree of bending is high. The degree of bending is low in Comparative Example 2 because the solar heat gain coefficient SHGC is as high as 0.58 and the heat shielding properties of the reduced pressure double glazed glass panel 1 are poor. In Comparative Examples 1 to 3, 5, and 6, the following relations hold: $-5 \leq a^* \leq 5$; and $b^* \leq 10$. Accordingly, the above-mentioned preferable reflected color can be easily obtained on the outside glass sheet 2.

Figure 4:
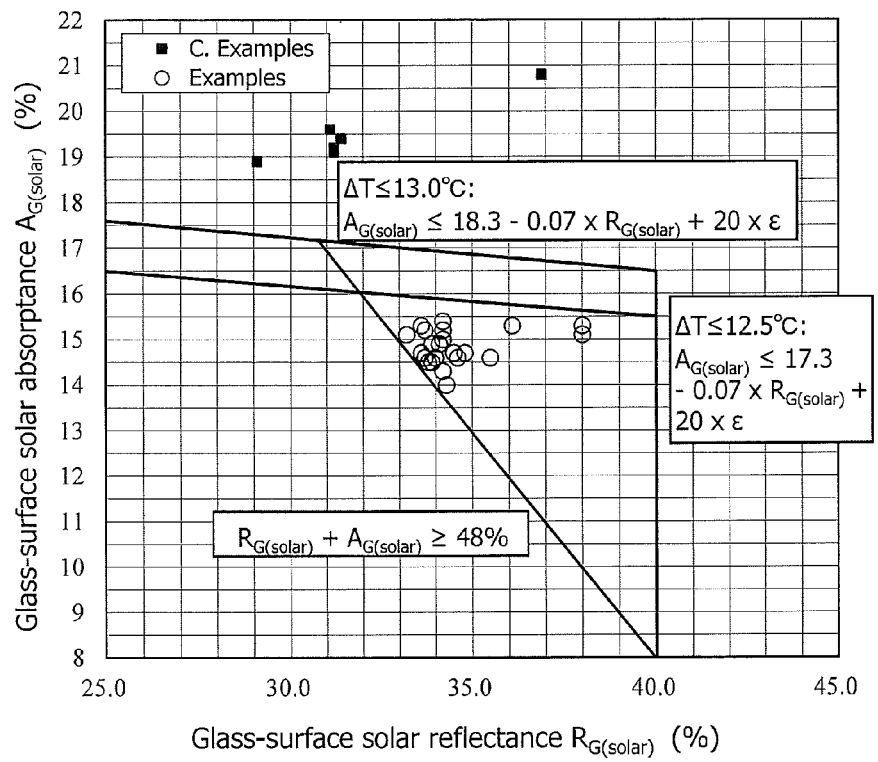
FIG. 4 is a graph showing the relationship between the glass-surface solar reflectance and the glass-surface solar absorptance in Examples and Comparative Examples of the present invention.
Figure 5:
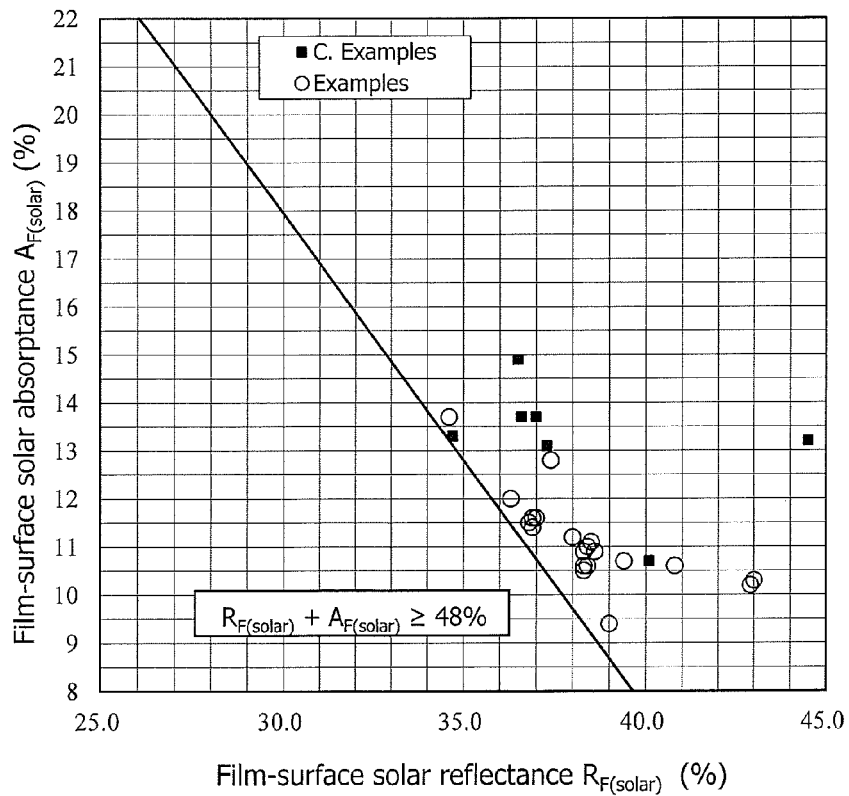
FIG. 5 is a graph showing the relationship between the film-surface solar reflectance and the film-surface solar absorptance in Examples and Comparative Examples of the present invention.

FIG. 4 is a graph showing the relationship between the solar reflectance $R_{G(solar)}$ as measured on the first surface 2a and the solar absorptance $A_{G(solar)}$ as measured on the first surface 2a in Examples and Comparative Examples. The solar absorptances $A_{G(solar)}$ in Examples (indicated by white circles in FIG. 4) are located within a region (a triangular region shown in FIG. 4) that satisfies the relations: $31 \leq R_{F(solar)} \leq 40$; $(48-R_{G(solar)}) \leq A_{G(solar)} \leq 17$; and $A_{G(solar)} \leq \{17.3 \times (0.07 \times R_{G(solar)})+(20 \times \in)\}$. The solar absorptances $A_{G(solar)}$ in Comparative Examples (indicated by black squares in FIG. 4) are located outside the above-mentioned region. FIG. 5 is a graph showing the relationship between the solar reflectance $R_{F(solar)}$ as measured on the surface of the Low-E film 5 and the solar absorptance $A_{F(solar)}$ as measured on the surface of the Low-E film 5 in Examples and Comparative Examples. The solar absorptances $A_{F(solar)}$ in Examples (indicated by white circles in FIG. 5) and the solar absorptances $A_{F(solar)}$ in Comparative Examples (indicated by black squares in FIG. 5) are located within a region (a region on the right side of a graph of $A_{F(solar)}=48-R_{F(solar)}$ shown in FIG. 5) that satisfies the relation $(48-R_{F(solar)}) \leq A_{F(solar)}$.

The outside glass sheet 2 and the inside glass sheet 3 are each not limited to a 3.1 mm-thick glass sheet as described in the present embodiment, and a glass sheet having another thickness or a combination of glass sheets having different thicknesses may be used. The type of the glass sheet can be arbitrarily selected. For example, figured glass, frosted glass (whose surface is processed to form a light scattering surface), wire mesh glass, wire line glass, tempered glass, heat strengthened glass, high transmittance glass, or a combination of these may be used. As for the glass composition, borosilicate glass, aluminosilicate glass, or various types of crystallized glass may be used.

The spacer 6 is not limited to a stainless steel spacer as described in the present embodiment, and the spacer 6 may be made of a metal such as iron, copper, aluminum, tungsten, nickel, chromium, and titanium, an alloy such as carbon steel, chromium steel, nickel steel, nickel-chromium steel, manganese steel, chromium-manganese steel, chromium-molybdenum steel, silicon steel, brass, and duralumin, ceramics, or glass. Less deformable materials can be used to prevent contact between a pair of glass sheets under external forces. The shape of the spacer 6 is not limited to a cylindrical shape, and it may be a sphere or a prism. The distance between the spacers also can be adjusted as appropriate.

INDUSTRIAL APPLICABILITY

The reduced pressure double glazed glass panel of the present invention can be used not only in architectural applications but also in various other applications for use in exposure to solar radiation. For example, the reduced pressure double glazed glass of the present invention can be used for vehicles (windows for automobiles, windows for railway vehicles, and windows for boats and ships), refrigerators placed outdoors, openable windows and wall materials for thermal insulating apparatuses, etc.

The invention claimed is:
1. A reduced pressure double glazed glass panel for separating an indoor space from an outdoor space, the reduced pressure double glazed glass panel comprising: a pair of glass sheets; and a gap portion formed between the pair of glass sheets and sealed under reduced pressure with a peripheral sealing portion provided between the pair of glass sheets along peripheries thereof,
- wherein the pair of glass sheets comprises an inside glass sheet provided to face the indoor space and an outside glass sheet provided to face the outdoor space,
- the outside glass sheet has a first glass surface disposed to face the outdoor space and a second glass surface disposed to face the gap portion,
  - a Low-E film with an emissivity $\in$ of 0.067 or less is formed on the second glass surface, the outside glass sheet has a solar reflectance $R_{G(solar)}$ of 31% or more and 40% or less as measured on the first glass surface, and the outside glass sheet has a solar absorptance $A_{G(solar)}$ of $(48-R_{G(solar)})\%$ or more and 17% or less as measured on the first glass surface,
- the reduced pressure double glazed glass panel has a solar heat gain coefficient SHGC of 0.50 or less and a thermal transmittance U value of 1.2 W/m²·K or less,
  - the Low-E film is a stack of a lower dielectric layer, a metal layer, a sacrifice layer, and an upper dielectric layer, which are stacked in this order on the second glass surface,
- the metal layer contains silver as a main component,
  - the sacrifice layer contains, as a main component, at least one metal material selected from titanium, zinc, nickel, chromium, niobium, and stainless steel or an oxide of the metal material,
  - the lower dielectric layer and the upper dielectric layer each include one or more amorphous layers and one or more crystalline layers,
  - the lower dielectric layer has a thickness of 5 nm or more and 40 nm or less,
  - the metal layer has a thickness of 11 nm or more and 16 nm or less,
  - the sacrifice layer has a thickness of 0.5 nm or more and 15 nm or less,
  - the upper dielectric layer has a thickness of 30 nm or more and 70 nm or less, and
  - wherein
  - (a) the lower dielectric layer is a stack of a first amorphous tin-zinc oxide layer and a first crystalline layer containing zinc oxide as a main component, which are stacked in this order, and the upper dielectric layer is a stack of a second crystalline layer containing zinc oxide as a main component, a second amorphous tin-zinc oxide layer, and an amorphous layer containing silicon nitride as a main component, which are stacked in this order, or
  - (b) the upper dielectric layer includes two or more crystalline layers containing zinc oxide as a main component and two or more amorphous layers containing silicon nitride as a main component, and the two or more amorphous layers containing silicon nitride as a main component are arranged to sandwich therebetween one of the two or more crystalline layers containing zinc oxide as a main component.

2. The reduced pressure double glazed glass panel according to claim 1, wherein the solar absorptance $A_{G(solar)}$ is $\{18.3-(0.07 \times R_{G(solar)})+(20 \times \in)\}\%$ or less.

3. The reduced pressure double glazed glass panel according to claim 2, wherein the solar absorptance $A_{G(solar)}$ is $\{17.3-(0.07 \times R_{G(solar)})+(20 \times \in)\}\%$ or less.

4. The reduced pressure double glazed glass panel according to claim 1, wherein the outside glass sheet on which the Low-E film is formed has a visible light absorptance $A_{F(vis)}$ of 12% or less as measured on a surface of the Low-E film.

5. The reduced pressure double glazed glass panel according to claim 1, wherein the outside glass sheet on which the Low-E film is formed has a 400 nm wavelength light absorptance $A_{F(400)}$ of 14% or less as measured on a surface of the Low-E film.

6. The reduced pressure double glazed glass panel according to claim 1, wherein
the metal layer is formed in contact with the crystalline layer included in the lower dielectric layer.

7. The reduced pressure double glazed glass panel according to claim 1, wherein the Low-E film includes a metal layer having a thickness of 11 nm or more and 16 nm or less.

8. The reduced pressure double glazed glass panel according to claim 1, wherein the outside glass sheet has a visible light reflectance $R_{G(vis)}$ of 30% or less as measured on the first glass surface.

9. The reduced pressure double glazed glass panel according to claim 1, wherein the outside glass sheet has a reflected color with an a* value of 10 or less and a b* value of 10 or less in the L*a*b* color space as measured on the first glass surface.

10. The reduced pressure double glazed glass panel according to claim 9, wherein
the outside glass sheet has the reflected color with an a* value of −5 or more and 5 or less in the L*a*b* color space as measured on the first glass surface, and
the outside glass sheet has the reflected color with a b* value of 10 or less in the L*a*b* color space as measured on the first glass surface.

11. The reduced pressure double glazed glass panel according to claim 1, wherein
the sacrifice layer contains an oxide of titanium as a main component,
the lower dielectric layer has a thickness of 10 nm or more and 30 nm or less,
the sacrifice layer has a thickness of 2 nm or more and 10 nm or less, and
the upper dielectric layer has a thickness of 43 nm or more and 60 nm or less.

12. The reduced pressure double glazed glass panel according to claim 1, wherein
the lower dielectric layer is a stack of a first amorphous tin-zinc oxide layer and a first crystalline layer containing zinc oxide as a main component, which are stacked in this order, and
the upper dielectric layer is a stack of a second crystalline layer containing zinc oxide as a main component, a second amorphous tin-zinc oxide layer, a first amorphous layer containing silicon nitride as a main component, a third crystalline layer containing zinc oxide as a main component, and a second amorphous layer containing silicon nitride as a main component, which are stacked in this order.

13. The reduced pressure double glazed glass panel according to claim 1, wherein
the lower dielectric layer has a thickness of 10 nm or more and 25 nm or less,
the metal layer has a thickness of 11 nm or more and 13 nm or less,
the sacrifice layer has a thickness of 2 nm or more and 10 nm or less, and
the upper dielectric layer has a thickness of 35 nm or more and 45 nm or less.

14. The reduced pressure double glazed glass panel according to claim 1, wherein a reflective layer having a refractive index of 1.8 or more and a thickness of 14 nm or more and 55 nm or less is formed on the first glass surface.

15. The reduced pressure double glazed glass panel according to claim 14, wherein the reflective layer includes two or more layers of different compositions.

16. The reduced pressure double glazed glass panel according to claim 1, wherein a stack of a layer containing silicon oxide as a main component and having a thickness of 5 nm or more and 15 nm or less and a layer containing titanium oxide as a main component and having a thickness of 2 nm or more and 5 nm or less, which are stacked in this order, is formed on the first glass surface.

* * * * *